United States Patent [19]

Berwald et al.

[11] Patent Number: 4,958,742

[45] Date of Patent: Sep. 25, 1990

[54] CONTAINER WITH SAFETY VALVE

[75] Inventors: Ernst Berwald, Bergkamen-Heil; Winfried Lewe, Kamen, both of Fed. Rep. of Germany

[73] Assignee: Schering Aktiengesellschaft, Bergkamen, Fed. Rep. of Germany

[21] Appl. No.: 216,370

[22] Filed: Jul. 7, 1988

[30] Foreign Application Priority Data

Jul. 17, 1987 [DE] Fed. Rep. of Germany ....... 3723645

[51] Int. Cl.[5] .......... F16K 15/02

[52] U.S. Cl. .......... 220/209; 220/203; 137/541; 137/543.13

[58] Field of Search .......... 220/203, 209; 137/542, 137/382, 541, 543.13

[56] References Cited

U.S. PATENT DOCUMENTS

| | | | |
|---|---|---|---|
| 2,088,226 | 7/1937 | Arvintz | 137/542 |
| 2,373,046 | 4/1945 | Osborn, Jr. | 137/542 |
| 2,599,622 | 6/1952 | Folmsbee | 137/541 |
| 2,787,127 | 4/1957 | Benz | 137/543.13 |
| 2,834,374 | 5/1958 | Klinkenberg | 137/543.13 |
| 3,035,604 | 5/1962 | Portis | 137/541 |
| 3,339,791 | 9/1967 | De Frees | 220/203 |
| 3,380,621 | 4/1968 | Rissberger, Jr. et al. | 220/203 |
| 4,024,983 | 5/1977 | Muehl | 220/316 |
| 4,181,238 | 1/1980 | Arnold et al. | 220/203 |

FOREIGN PATENT DOCUMENTS

| | | | |
|---|---|---|---|
| 64790 | 11/1980 | Australia . | |
| 970245 | 7/1975 | Canada | 137/541 |

*Primary Examiner*—A. Michael Chambers

*Attorney, Agent, or Firm*—Scully, Scott, Murphy & Presser

[57] ABSTRACT

A pressure relief assembly arranged in the upper central region of a container for carrying liquids under pressure. The pressure relief assembly is provided in a hole in the container and includes a cylindrical housing having one end closed off and provided with an opening for a pressure relief valve. The pressure relief valve is mounted on a mounting plate which has a diameter greater than the hole provided in the bottom wall of the cylinder. A tube element is welded to the container about the opening to which the cylindrical housing of the pressure relief assembly is attached through the provision of a circumferential mounting flange. A cover may be provided over the cylindrical housing of the pressure relief assembly to protect the assembly from weather.

10 Claims, 3 Drawing Sheets

CONTAINER WITH SAFETY VALVE

BACKGROUND OF THE INVENTION

1. Field of the Invention

The present invention relates to a container for the receipt of liquids, incorporating a pressure relief assembly which is arranged in the upper central region of the container.

Containers of that type are basically known in the technology, and among other considerations, serve for the transport as well as for the storage of liquids which are extremely reactive or fire-hazardous under environmental conditions, and from which dangers are encountered, such as dangers to the health in the instance of an uncontrolled discharge into the environment, for example, of spontaneously or self-igniting liquids. Due to reasons of safety, these liquids are maintained in the container under a pressurized or superatmospheric condition through the intermediary of an inert gas.

A manhole may be provided which serves for the inspection of the interior of the container at regular time intervals is located in the center of the upper region of the container which is as a rule is formed by a horizontally lying, cylindrical base member, such as a cylindrical tank container.

A safety valve, for instance, a pressure relief valve, may be provided in the manhole and must be constantly located above the liquid level, so that in the case of the opening thereof under an excess pressure, merely gas and no liquid will be blown out. In order in the last-mentioned instance, to allow for a rapid venting, the discharge cross-section must possess a minimum cross-section in conformance with the volume of gas which is arranged within the container. The exiting gas should hereby be blown out or vented vertically.

In order to ensure, even at an inclined or tilted position of the vehicle carrying the container, that the discharge opening of the safety valve will remain above the liquid level, it is usual to locate the safety valve at the smallest possible distance from the manhole. However, the size of the space which is available in proximity to the manhole presents problems in the accommodation of the safety valve, especially inasmuch as a minimum discharge cross-section is required for this valve, and this cross-section is required to always be located above the liquid level.

2. Discussion of the Prior Art

However, the heretofore known safety valve arrangements which fulfill the above demands lead to relatively complex mountings on the container, due to which the constructional volume thereof is increased, and consequently, the suitability thereof as a transport container for ocean or sea commerce is reduced. A further disadvantage encountered in the current types of constructions resides in that, in the event of the opening of the safety valve at an inclined or tilted position of the vehicle carrying the container, because of the reduced distance of the venting opening from the liquid level, portions of the liquid are dragged along, and as a consequence thereof are blown out of the container.

SUMMARY OF THE INVENTION

Accordingly, it is an object of the invention to so configure and develop a container of the above-mentioned type, that in a constructively simpler manner, and at an optimum utilization of the constructional volume, there is provided assurance against even only a partial blowing out or expulsion of liquid in the case of venting of the safety valve.

The foregoing object is inventively achieved through the intermediary of the container in that the safety valve is arranged in the pressure relief assembly. Inasmuch as the pressure relief assembly is usually located in a central upper region of the container, in this manner there is obtained the greatest possible distance between the discharge or vent opening of the safety valve and the exposed or open liquid surface. Already achieved by means of this distance is an increase in the degree of safety against an unintentional blowing out or expulsion of portions of the liquid in the event of the response by the safety or pressure relief valve. This concept is applicable due to the arrangement of the pressure relief assembly even in an inclined or tilted position of the vehicle which carries the container. At the same time, because of its cross-sectional dimensions, the pressure relief assembly affords the provision of an adequate discharge surface so as to ensure a rapid venting in the case of the presence of an excess pressure. This blowing out or venting is also always effectuated in a vertical direction, so that constructive measures which are required for the mounting of a safety valve can be maintained extremely simple.

Pursuant to further features of the invention, the pressure relief assembly is constructed as a cylindrical component, whose one end surface is closed off by a bottom portion in which the safety valve is received, whereby this bottom portion is welded together with the cylindrical component in an expedient manner. It is this bottom portion in which the safety valve is detachably arranged, which can be disassembled in its entirety, and to be able to be employed, for example, about the opening in the container. As a result thereof, the pressure relief assembly is threadingly fastened with the rim structure of the opening in the container. In this manner, there is not only assured an easy accessibility to the safety valve; for example, for purposes of inspection, but provision is also made that, through the arrangement of the safety valve, the functioning of the pressure relief assembly will not be adversely influenced. Inasmuch as the pressure relief assembly can be located recessed within the container wall, through the constructive combination of the pressure relief and the safety valve there are no constructional changes which would affect the external dimensions and thereby the structural volume of the container. This is of particular significance for the storage volume which is required for the container when intended to be employed for ocean or sea commerce. Consequently, the inventive container, at an optimum utilization of this structural volume, brings along an increased degree of safety against accident or damage during transport.

Through the further features and development of a cover extending over the pressure relief assembly, the safety valve is hermetically sealed off from all environmental influences. Concurrently, due to the friction-tight attachment of the cover, in the instance of a response of the safety valve, this will allow the cover to be displaced and to thereby facilitate the discharge of the gas. Concurrently, the cover can be advantageously employed as a carrier for piping or plumbing arrangements.

Pursuant to still further features of the invention, there is provided a simplification and readily monitorable aspect in the construction of the inventive pressure relief assembly. Hereby, in that the distance between the bottom portion and the cover is dimensioned so as to be larger than the maximum path of displacement of the movable components of the safety valve, there is attained that any displacement of the cover exclusively results from the action of the gas pressure encountered interiorly of the cylindrical pressure relief assembly, in the event of the opening of the safety valve. Expediently, the safety valve is fastened to the side of the bottom portion facing towards the cover, such that any movable components of the valve project into the pressure relief assembly.

The rim structure of the pressure relief assembly is preferably formed by a cylindrical pipe or conduit segment in the type of a block flange. In this manner there is concurrently provided an adequate contact or engaging surface for the insert element, especially for the ring-shaped flange which is welded thereto, whereby this contact surface simultaneously serves as a bearing surface for an applicable sealing element.

BRIEF DESCRIPTION OF THE DRAWINGS

Reference may now be had to the following detailed description of an exemplary embodiment of the inventive container, taken in conjunction with the accompanying drawings; in which.

DETAILED DESCRIPTION

Figure 1:
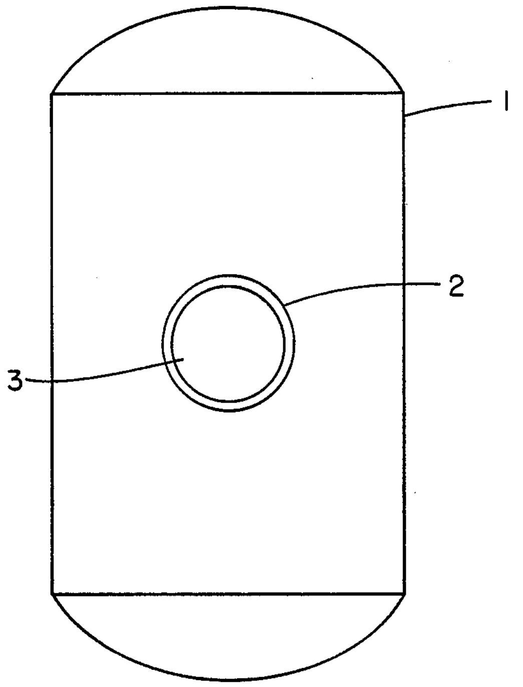
FIG. 1 illustrates a top plan view of a container pursuant to the invention.
Figure 2:
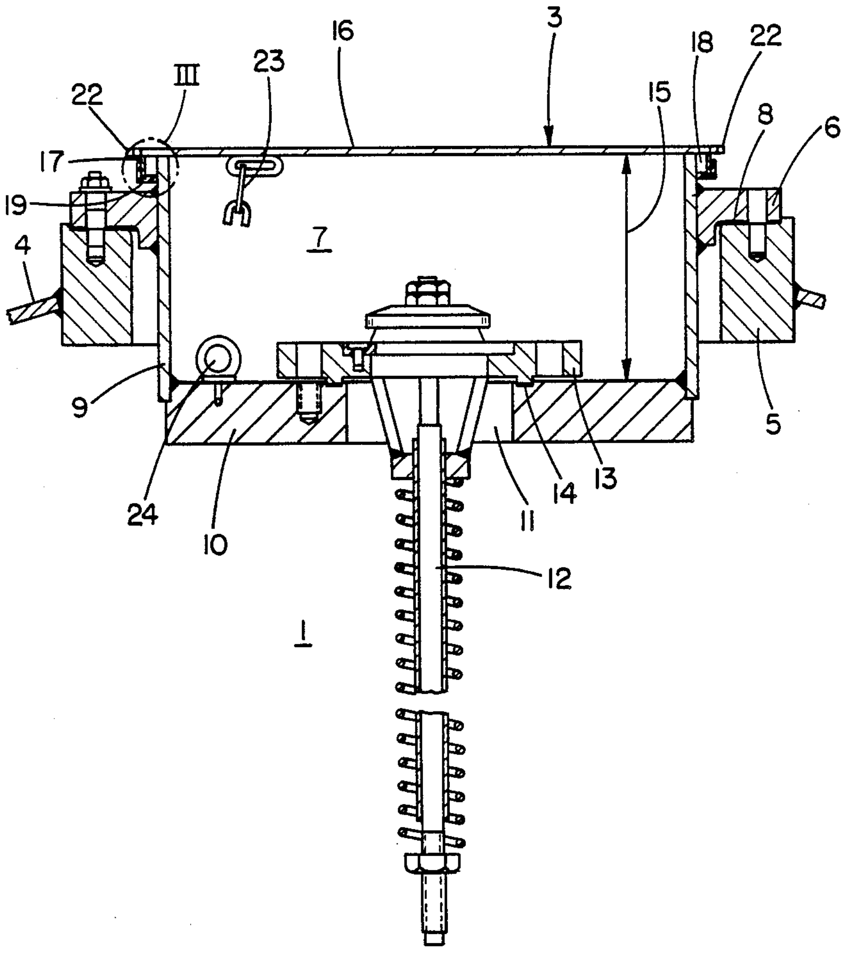
FIG. 2 illustrates a cross-sectional view through an inventive pressure relief assembly arrangement in the container.

In FIG. 1 of the drawings, reference numeral 1 identifies a horizontally arranged, essentially cylindrically configured container, such as a tank container, in which an opening 2 is located in the upper central region thereof. The an opening 2 concurrently serves for the receipt of a safety or pressure relief valve insert, which is closed off on its upper side by means of a cover 3. Hereinbelow, there is described in detail the construction of the pressure relief assembly, having reference to FIGS. 2 through 4 of the drawings.

The pressure relief assembly is formed by a cylindrical conduit or pipe segment 5 which is welded into the wall structure 4 of the container 1, and wherein the external end surface of the conduit element 5 serves for the fastening of the ringshaped flange 6 of a pressure relief assembly 7. The ring-shaped flange 6 is screwed to the end surface of the conduit element 5, with the interposition of a sealing disc 8.

The pressure relief assembly 7 is formed by a circularly cylindrical housing 9, into the end surface thereof facing towards the interior of the container there is welded a bottom portion 10, and whose other end surface is closed off by the cover 3.

The above-mentioned ring-shaped or annular flange 6 is welded to the outside of the housing 9. The welding together of the annular flange 6 with the housing 9 is implemented in such a manner, that the latter will, in the assembled condition, project to the largest possible extent into the container 1. As a result thereof, the portion of the entire arrangement which projects outwardly from the wall structure 4 is maintained relatively short.

The bottom portion 10 possesses an opening 11 in its central region, into which there is inserted a resiliently-biased or spring-activated, known per se commercially available safety or pressure relief valve 12. The fastening of the safety valve to the bottom portion 10 is carried out with the interposition of a fastening ring 13 which encompasses the opening 11, and which is fastened to the bottom portion 10 through suitable screw fasteners, and with the interposition of a sealing ring 14.

The axial length 15 of the housing 9 is dimensioned in such a manner that, in the event of the opening of the safety valve 12, the cover 3 is displaced exclusively by the action of gas pressure which is present within the housing 9, and not by any components of the safety valve 12.

Figure 3:
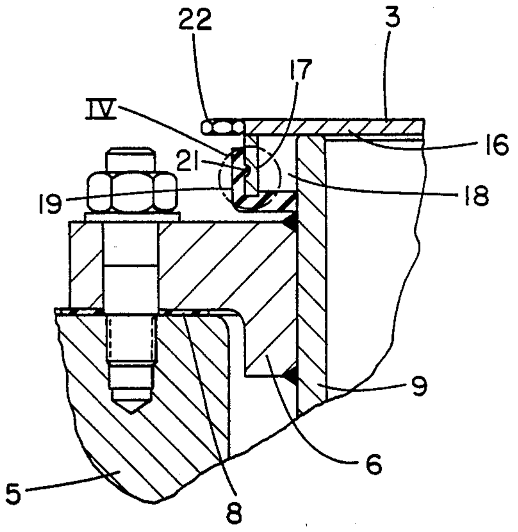
FIG. 3 illustrates, on an enlarged scale a fragmentary representation of the encircled part III in FIG. 2.
Figure 4:
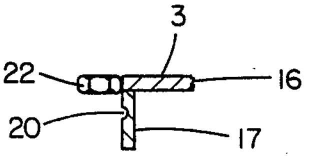
FIG. 4 illustrates, on an enlarged scale, a fragmentary representation of the encircled part IV in FIG. 3.

The cover 3 consists of a circular plate 16 to the periphery of which there is welded on a cylindrical part extending perpendicularly relative thereto, as best seen in FIG. 3. The inner diameter of the cylindrical part 17 is dimensioned to be larger than the outer diameter of the cylindrical housing 9 such that, with the cover 3 being applied, an annular interspace 18 will remain between the inner surface of the above-mentioned cylindrical part and the outer surface of the housing. Into this interspace or gap 18 there projects one shank of a clamping ring 19, which is constructed V-shaped in cross-section and which is constituted from an elastic material; for example, from a suitable rubber or a comparable plastic, and which for the remainder contacts against the outside of the cylindrical part 17. In the applied condition of the cover, the above-mentioned shank of the clamping ring which contacts against the outside of cylindrical part 17 is subjected to a certain prestressing, whereby the cover is positioned in place in a friction-tighter manner.

For effectuating the fastening of the clamping ring 19; namely that of the arm shank contacting on the outside of the cylindrical part 17, the outside of the part 17 is provided with annular groove 20 into which there engages an encompassing rib 21 which is formed on the applicable side of the clamping ring 19.

Reference numeral 22 identifies nuts which are welded to and about the circumferential side of the circular plate 16, through which, in a manner which is not illustrated, there is provided a sealing of the cover 3.

Reference numeral 23 identifies a chain having one end thereof fastened to the inside of the cover 3 and another end (not shown) fastened to an eyebolt 24 which is screwed into the bottom portion 10. This chain 23 has its length dimensioned such that a lifting off of the cover 3 which is caused by an internal gas pressure will not be hindered; however, the cover will remain connected with the pressure relief assembly so as to be secured from being lost.

It can be ascertained from the foregoing representation that, through the inventive pressure relief assembly, there is provided the greatest possible distance of the discharge surface of the valve; in effect, its venting opening from the liquid level in the container, and namely, also during an eventual inclined or tilted position of a vehicle supporting the container. This greater distance, in the event of the venting of the valve, imparts also a correspondingly enhanced degree of safety against any partial venting of liquid in the case of the opening of the safety or pressure relief valve. Inasmuch as the pressure relief assembly, will for the greatest part extend into the container, any attachments which are required on the outside of the container which are necessary for the mounting of the pressure relief assembly, become relatively small in size, whereby the structural height of the container is advantageously influenced. This improves the utilization of the constructive volume and, as a result, the suitability of the inventive container as a transport container for sea or ocean commerce. Finally, through the employment of the cover 3 in connection with the clamping ring 19, there is also provided a dependable protection of the pressure relief assembly from environmental influences of any kind.

What is claimed is:

1. A pressure relief assembly for a container for the receipt of liquids, said container having a cylindrical element fixed in an opening for accommodating said pressure relief assembly, said element extending perpendicular to a wall of said container, said pressure relief assembly comprising a cylindrically shaped housing, said housing being provided with a removable cover frictionally secured to a first end of said cylindrical housing and a bottom wall fixedly and non-removably secured to a second end of said cylindrical housing, a circumferential mounting flange secured to the outer circumference of said cylindrical housing adjacent said first end, said bottom wall of said cylindrical housing being provided with an opening for mounting a relief valve which extends outwardly into said container from said pressure relief assembly; wherein said relief valve extends into said assembly less than half the length of said cylindrical housing, said relief valve being secured to a mounting plate through a sealing gasket to said bottom wall, said mounting plate having a diameter greater than said opening in said bottom wall.

2. A pressure relief assembly according to claim 1, wherein said cover is frictionally sealed to said first end of said cylindrical housing, such that said cover will lift off said housing at a predetermined pressure.

3. A pressure relief assembly according to claim 2, wherein said cover is attached to said bottom wall by means of a tether.

4. A tank to hold liquids, comprising an elongated, substantially cylindrical container closed at both ends, a pressure relief assembly provided in the central area of said substantially cylindrical container, said pressure relief assembly having a circular-cylindrical housing secured to a cylindrical tube element extending perpendicular to a wall of said container, said housing having a bottom part closing off one end and extending into said container, said bottom part having a relief valve seated in an opening therein and extending into said container, a circumferential mounting flange about an outer circumference of said housing for securing said housing to said tube element of said container, and a removable cover frictionally secured to a second end of said cylindrical housing, wherein said relief valve is mounted in a hole provided in said bottom wall and extending into said container, said pressure relief assembly being permanently secured to said container by means of said cylindrical tube element secured to said container.

5. A tank as claimed in claim 4, wherein said safety valve is detachably arranged in said bottom wall.

6. A tank as claimed in claim 4, wherein said cover closes said assembly with respect to the atmosphere, said cover being secured friction-tightly relative to the assembly.

7. A tank as claimed in claim 6, comprising a clamping ring for fixing the cover relative to the assembly, said clamping ring being constituted from a rubber-elastic material and being in friction-tight engagement with the outside of the assembly.

8. A tank as claimed in claim 4, wherein said housing, said relief valve, and an aperture formed in the bottom portion for the gas discharge from the container and the actuation of the relief valve are in a coaxial arrangement.

9. A tank as claimed in claim 4, wherein the end of said relief valve facing towards the cover includes an annular flange for detachably fastening to the wall structure of the container, and the distance of the bottom portion from the cover is dimensioned to be greater than the maximum path of displacement of movable parts of said relief valve.

10. A tank as claimed in claim 4, wherein the tube element of said assembly comprises a cylindrical conduit segment which is fixedly connected with the wall structure of the container, and one end surface of said conduit segment comprising a supporting surface for the assembly.

* * * * *